United States Patent [19]

Cole, Jr.

[11] 3,837,944

[45] Sept. 24, 1974

[54] SELECTIVE ETCHING OF METAL OXIDES OF TIN OR INDIUM

[75] Inventor: Herbert S. Cole, Jr., Scotia, N.Y.

[73] Assignee: General Electric Company, Schenectady, N.Y.

[22] Filed: Sept. 1, 1972

[21] Appl. No.: 285,601

[52] U.S. Cl. ........................ 156/4, 96/36.2, 117/211, 117/212, 117/217, 156/8

[51] Int. Cl. ........................ C23f 1/02

[58] Field of Search ........ 117/27, 28, 5.5, 211, 212, 117/217; 156/4, 3, 8, 11, 13, 17; 96/36–36.5; 252/79.2

[56] References Cited

UNITED STATES PATENTS

| | | | |
|---|---|---|---|
| 2,762,726 | 9/1956 | Saunders | 117/211 X |
| 2,769,733 | 11/1956 | Pool | 117/211 |
| 2,995,461 | 8/1961 | Boicey et al. | 117/5.5 |
| 3,031,344 | 4/1962 | Sher et al. | 117/27 X |
| 3,109,754 | 11/1963 | Tielens et al. | 117/217 |
| 3,226,256 | 12/1965 | Schneble et al. | 117/217 X |
| 3,443,944 | 5/1969 | Wise | 96/36.2 |
| 3,558,310 | 1/1971 | Mayaud | 96/36.1 |
| 3,615,465 | 10/1971 | Bullinger | 96/36.2 |

*Primary Examiner*—William A. Powell
*Attorney, Agent, or Firm*—Paul F. Wille; Joseph T. Cohen; Jerome C. Squillaro

[57] ABSTRACT

Metal oxides such as tin oxide and indium oxide are selectively etched by coating the surface to be etched with photoresist, selectively exposing the photoresist in a desired pattern and developing the photoresist to remove the unexposed areas. In the case of tin oxide, for example, the unprotected tin oxide and remaining photoresist are then coated with a water-or-alcohol-soluble polymer including powdered zinc, for example. The polymer solution with the zinc dispersed therein is then dried in an oven to remove residual solvent, leaving a uniform, tenacious film of zinc dispersed in the polymer. The tin oxide is then etched in a hydrochloric acid solution. The hydrochloric acid reacts with the zinc to produce atomic hydrogen which reduces the tin oxide to tin, which in turn is etched with the hydrochloric acid, thereby producing an etched pattern in the tin oxide.

11 Claims, 4 Drawing Figures

SELECTIVE ETCHING OF METAL OXIDES OF TIN OR INDIUM

Figure 1:
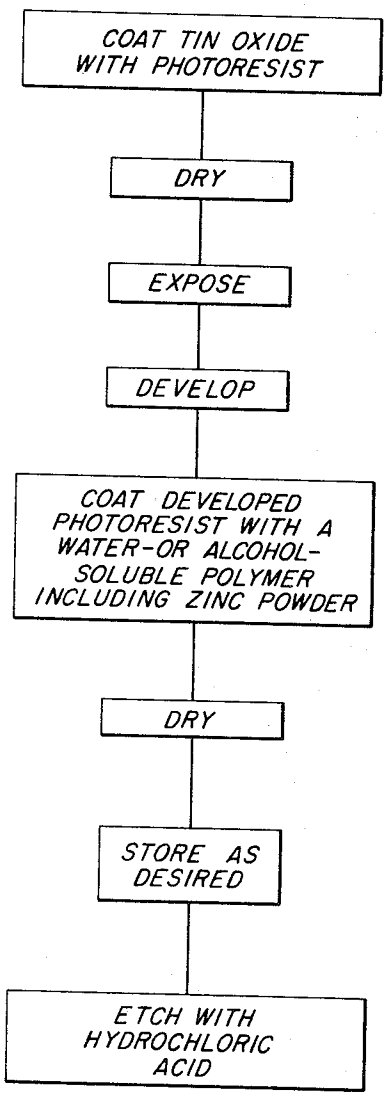

The present invention relates to selective etching of metal oxides and more specifically to improved methods for selectively etching tin oxide and indium oxide.

The need for an economical and commercially acceptable method for etching tin oxide and indium oxide has become particularly acute in the area of liquid crystal display devices. Liquid crystal displays generally employ a nematic liquid crystal material enclosed between two transparent conductive substrates or one transparent and one reflective conducting substrate. Generally, the conductive substrate is provided by employing a thin layer of tin oxide or indium oxide over a glass plate. Selected areas of the tin or indium oxide are removed so that various displays can be achieved. However, the removal of tin or indium oxide, as carried out by well-known photoresist techniques, is not entirely satisfactory. For example, etching of tin oxide is generally achieved by coating the tin oxide layer with a photoresist, exposing the photoresist to the desired pattern and removing the unexposed areas of the photoresist by a developing solution. The unprotected or exposed tin oxide is then etched either by an electrolytic process or with a mixture of powdered zinc in concentrated or dilute hydrochloric acid. The former process is elaborate and time consuming, whereas the latter process requires large amounts of zinc and hydrochloric acid which, when spent, create a large waste disposal problem.

It is therefore an object of this invention to provide a simple and economical method for etching metal oxides of tin or indium which does not create waste disposal problems.

It is a further object of this invention to provide a process for etching tin or indium oxide which permits etching in selected regions thereof without exposing other regions to the etchant.

Yet another object of this invention is to provide a process for etching tin or indium oxide which is acceptable for large scale commercial applications.

Still another object of this invention is to provide a process for etching tin or indium oxide which efficiently utilizes all materials and minimizes waste problems.

Briefly, these and other objects are achieved in accord with one embodiment of my invention in which conventional photofabrication techniques are employed to define regions of the tin or indium oxide to be removed by subsequent etching. Photofabrication techniques generally employ a coating of a photoresist material which is dried, exposed and developed to produce a suitable pattern on the tin oxide. In accord with my invention, after the photoresist is developed, a coating of a water-or-alcohol-soluble polymer with a powdered or finely divided metal which acts as a reducing agent, such as zinc, is dispersed therein and coated over the developed photoresist and exposed regions of the tin or indium oxide. The coating is then dried to remove residual solvent and leave a uniform tough coating of zinc dispersed in the polymer. The tough polymer coating protects the photoresist and permits storage of the material until it is subsequently necessary to etch the tin or indium oxide. In further accord with my invention, the etching step is performed by flowing a hydrochloric acid solution over the surface of the polymer or by immersing the material in hydrochloric acid solution. The hydrochloric acid solution dissolves the polymer and reacts with the zinc to produce atomic hydrogen which etches the tin or indium oxide.

Figure 2A:
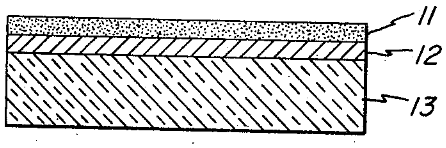
Figure 2B:
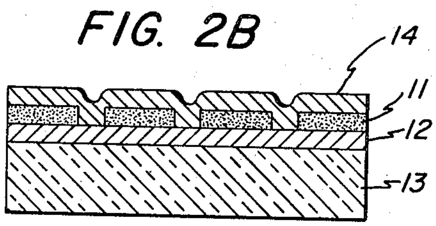
Figure 2C:
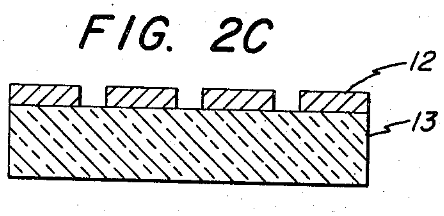

The features of the invention believed to be novel are set forth in the appended claims. The invention itself, together with further objects and advantages thereof, may be best understood by reference to the following description taken in conjunction with the accompanying drawings in which:

FIG. 1 is a flow diagram illustrating the steps employed in practicing my invention; and FIGS. 2*a*, 2*b* and 2*c* illustrate a sequence of steps in the process of etching tin oxide in accord with my invention.

In accord with my invention as outlined in the flow chart of FIG. 1 and the illustrations of FIGS. 2*a*, 2*b* and 2*c*, metal oxides of tin or indium are selectively etched in a highly efficient and economical manner. More specifically, and referring to FIG. 1 which illustrates the etching of tin oxide, for example, the tin oxide to be etched is first coated with an etch resistant material such as Kodak Photoresist sold by the Eastman Kodak Company. The use of such materials is well known to those skilled in the art and further description and usage thereof is unnecessary. However, reference may be made to a publication of the Eastman Kodak Company, Rochester, New York, entitled "An Introduction to Photofabrication Using Kodak Photosensitive Resists," published in 1966, if further information is desired.

In general, the tin oxide to be etched is coated with the photoresist material, dried and exposed to an intense light, such as an ultraviolet source, through a photographic negative which protects selected regions of the photoresist from the light source. The exposed photoresist is then developed by rinsing with a suitable solvent. The regions of the photoresist exposed to the light source are not removed by the solvent since they were crosslinked by the light source. However, the uncrosslinked photoresist is removed and exposes the surface of the tin oxide in the selected regions.

FIG. 2*a* illustrates a layer of photoresist 11 overlying a layer of tin oxide 12. The tin oxide 12 is shown adhering to a substrate 13, such as glass, quartz, plastic or other suitable material.

After the photoresist layer 11 is patterned, it is coated with a water-or-alcohol-soluble polymer including a metal powder which acts as a reducing agent. Suitable metals, for example, include iron, zinc, magnesium and aluminum. Those skilled in the art can appreciate that still other metals may be employed and the foregoing list is merely by way of illustration and not limitation. The polymer solution with the metal dispersed therein is applied to the patterned photoresist and exposed regions of the tin oxide by either dip or spinning techniques, for example. The coated structure is then dried in an oven to remove any residual solvent and thereby provide a substantially uniform, hardened film of polymeric material with the metal powder dispersed therein. The formation of this hardened and tough film 14 provides numerous advantages over prior art techniques for etching tin oxide. For example, the hardened film 14 protects underlying photoresist and tin oxide from contamination so that the structure may be stored in this condition until it is desired to etch the tin oxide. This feature is particularly significant for commercial production applications where it is often desirable to store or transfer materials before subsequent use.

Still another advantage of my invention over prior art methods is the diminished threat of hazards generally associated with handling some metal powders. For example, powdered zinc is prone to explode under certain conditions. However, by dispersing the zinc in a polymer, this threat is substantially diminished if not completely eliminated.

Still another advantage flowing from my invention is the substantial savings in cost associated with the elimination of excess amounts of metal powder which do not react in prior art processes and which subsequently create a large waste disposal problem. This feature of my invention will be discussed more fully below.

Continuing with the description of my invention, the step of etching the tin oxide is carried out by immersing the structure in dilute or concentrated hydrochloric acid. The tough polymer film is dissolved by the acid and at the same time the acid reacts with the metal powder to produce a metal chloride and atomic hydrogen. The atomic hydrogen reacts with the tin oxide to reduce the tin oxide to elemental tin and water. The elemental tin is then efficiently etched by the hydrochloric acid, leaving no residual tin oxide behind and at the same time not requiring excess amounts of metal powder to produce the desired etching. FIG. 2c illustrates a layer of tin oxide etched in accord with my invention after the developed photoresist layer 11 is removed.

In practicing my invention, I have found that complete etching of the metal oxide of tin or indium is achieved by employing hydrochloric acid solution in concentrations between approximately 20 and 38 percent. Lower concentrations do not appear to completely remove the metal oxide in a single step. However, where necessary or desirable, lower concentrations may be used effectively by repeating the etching step.

An alternate method of etching, particularly useful where it is desired to etch in only a selected region of the structure, is to spread the hydrochloric acid on the surface of the polymer film where it is desired to etch the tin oxide. In this way, selected regions may be etched without subjecting other regions to the corrosive action of the hydrochloric acid. It is also possible to apply the metal dispersion on selected areas, thereby permitting selective etching.

In practicing my invention, I have found that numerous polymers are soluble in alcohol or water, for example, and form tough films when the solvent is evaporated or otherwise removed therefrom. Polymers which are useful in the practice of my invention include such materials as polyvinyl pyrrolidone, a product of General Aniline and Film Corporation; Polyox, a water soluble resin of Union Carbide Corporation; Elvanol, a polyvinyl alcohol of E. I. DuPont de Nemours & Company; hydroxyethyl cellulose, sold under the tradename Natrosol by Hercules Powder Company. Those skilled in the art can readily appreciate that the foregoing materials are listed merely by way of illustration and not limitation. Still other materials may be employed if desired. For example, alcohol soluble butyrates, gelatin, carbowax, carboset and Guar Gum are also useful. When employing watersoluble polymers, however, it is desirable to employ a surfactant such as Triton X-100, a product of Rohm & Haas Chemical Company, for example, to permit wetting of the substrate.

As pointed out above, a particularly desirable feature of my invention is the substantial savings in cost associated with the elimination of excess amounts of metal powder, such as zinc, which are required in prior art processes for etching tin or indium oxide. In accord with my invention, I am able to employ only that amount of metal powder required to react with the hydrochloric acid which is necessary for the etching step of the process. More specifically, I have found that tin and indium oxide layers having thicknesses of 3 to 4 microns can be readily etched by dispersing between approximately 20 and 90 percent by weight of zinc, for example, in the polymer. I have found that this percentage of zinc is sufficient to successfully etch the tin or indium oxide while not creating a waste disposal problem. Further, I have found that these concentrations of zinc are useful, substantially independent of the thickness of the tin or indium oxide layers. Similar percentages of other metal powders are also effective in etching tin and indium oxide.

So that those skilled in the art can readily appreciate the numerous advantages flowing from my invention, the following specific examples are given by way of illustration and not by way of limitation. In all of the examples, parts are by weight and temperatures are in degrees Celsius unless otherwise stated.

EXAMPLE 1

Four grams of polyvinyl pyrrolidone, 40 grams of powdered zinc and 76 grams of methanol are mixed. The polymer solution is then spin coated on a tin oxide covered substrate of glass with a patterned photoresist overlying the tin oxide layer. The substrate is heated for approximately ten minutes at 80° to remove the residual methanol and form a hardened film of polyvinyl pyrrolidone with zinc powder dispersed therein. Concentrated hydrochloric acid (38 percent) is then poured across the surface and allowed to remain until the reaction has subsided, approximately one minute. The substrate is then rinsed with distilled or tap water and the remaining photoresist is then removed with benzene, for example, to yield the desired pattern in the tin oxide layer.

EXAMPLE 2

In a similar manner, a tin oxide layer is etched as described in Example 1, but after forming the hardened film of polymeric material with zinc dispersed therein, the substrate is stored on an open shelf for approximately ten days before it is etched in the manner described in Example 1.

EXAMPLE 3

In a similar manner, as described in Example 1, an indium oxide covered substrate is etched.

EXAMPLE 4

Four grams of polyvinyl pyrrolidone, one gram of aluminum powder and 76 grams of methanol are mixed. The polymer solution is then coated on a patterned photoresist overlying a tin oxide layer. The coating is air dried for ten minutes and 20 percent hydrochloric acid is poured on the surface. After approximately one minute, the acid is rinsed off with tap water.

The photoresist is removed and the desired pattern is etched in the tin oxide.

EXAMPLE 5

One gram of grade 51-05 Elvanol, a polyvinyl alcohol, eight grams of zinc powder, 50 grams of methanol and 50 grams of water are mixed. The mixture is then coated on a patterned photoresist overlying an indium oxide layer. The coating is air dried for ten minutes and 20 percent hydrochloric acid is poured on the surface. After approximately one minute the acid is rinsed off with tap water. The photoresist is removed and the desired pattern is etched in the indium oxide.

EXAMPLE 6

One gram Polyox WSR N3000, four grams of powdered zinc, 50 grams water and 50 grams of methanol are mixed. The mixture is spin coated on a patterned photoresist overlying a tin oxide layer. The coating is air dried for ten minutes and then immersed in 20 percent hydrochloric acid for one minute. The acid is washed off with tap water and the photoresist is removed by scrubbing with benzene. The desired pattern is etched in the tin oxide.

Although the above examples have shown various modifications and variations of my invention, it is obvious that still other modifications and variations are possible. It is therefore to be understood that changes may be made in the particular embodiments of the invention described which fall within the full intended scope of the invention as defined by the appended claims.

What I claim as new and desire to secure by Letters Patent of the United States is:

1. A method of selectively etching a layer of a metal oxide of tin or indium overlying a substrate, said method comprising the steps of:

forming a pattern of removed and remaining portions of an etch resistant material over at least a portion of the surface of said metal oxide layer;

coating the patterned surface with a polymer solution including a metal powder which acts as a reducing agent;

drying said polymer solution to produce a hardened film of polymeric material with the metal powder dispersed therein; and then etching with a solution of hydrochloric acid the regions of said metal oxide where said etch resistant material is removed.

2. The method of claim 1 wherein said polymer solution is prepared by dispersing zinc powder in a water or alcohol soluble polymer.

3. The method of claim 1 wherein the step of drying comprises heating said solution sufficiently to vaporize the solvents.

4. The method of claim 1 wherein said polymer is selected from the group consisting of polyvinyl pyrrolidone, Polyox, polyvinyl alcohol and hydroxyethyl cellulose.

5. The method of claim 1 wherein the step of etching is performed by immersing the metal oxide covered substrate with the hardened film thereon in a solution of hydrochloric acid.

6. The method of claim 1 wherein the concentration of metal powder in said polymer solution is sufficient to efficiently etch said metal oxide.

7. The method of claim 6 wherein the concentration of metal powder is between approximatley 20 and 90 percent by weight of the polymer.

8. The method of claim 1 wherein said metal powder is selected from the group consisting of iron, zinc, magnesium and aluminum.

9. The method of claim 1 wherein said polymer is polyvinyl pyrrolidone.

10. The method of claim 1 wherein said hydrochloric acid concentration is between approximately 20 and 38 percent.

11. The method of claim 1 wherein said step of drying said polymer solution is followed by the additional step of:

storing the polymer film coated substrate.

* * * * *